(12) United States Patent
Hegardh

(10) Patent No.: US 12,314,328 B2
(45) Date of Patent: May 27, 2025

(54) MACHINE LEARNED MODEL FOR CONTRACT GENERATION IN A DOCUMENT MANAGEMENT SYSTEM

(71) Applicant: DocuSign, Inc., San Francisco, CA (US)

(72) Inventor: Johan Hegardh, Gothenburg (SE)

(73) Assignee: Docusign, Inc., San Francisco, CA (US)

( * ) Notice: Subject to any disclaimer, the term of this patent is extended or adjusted under 35 U.S.C. 154(b) by 0 days.

(21) Appl. No.: 18/101,286

(22) Filed: Jan. 25, 2023

(65) Prior Publication Data

US 2024/0248934 A1 Jul. 25, 2024

(51) Int. Cl.
  G06F 17/30 (2006.01)
  G06F 16/93 (2019.01)
  G06Q 50/18 (2012.01)

(52) U.S. Cl.
  CPC ............. *G06F 16/93* (2019.01); *G06Q 50/18* (2013.01)

(58) Field of Classification Search
  CPC ........ G06F 16/13; G06F 16/24; G06F 16/156; G06N 3/00; G06N 5/00; G05B 13/00
  See application file for complete search history.

(56) References Cited

U.S. PATENT DOCUMENTS

| | | | | |
|---|---|---|---|---|
| 5,898,156 A * | 4/1999 | Wilfong | ................. | G06V 40/30 235/382.5 |
| 6,938,157 B2 * | 8/2005 | Kaplan | ................. | H04L 9/3218 713/176 |
| 7,167,844 B1 * | 1/2007 | Leong | ................. | G06Q 50/188 705/37 |
| 9,634,975 B2 * | 4/2017 | McCabe | ............... | H04L 51/234 |
| 10,133,791 B1 * | 11/2018 | Chan | ....................... | G06F 16/22 |
| 10,430,570 B2 * | 10/2019 | Gonser | ................ | B42D 25/305 |
| 11,182,549 B2 * | 11/2021 | Carlson | ................ | G06F 40/279 |
| 11,657,101 B2 * | 5/2023 | Walia | .................... | G06F 16/904 707/741 |
| 11,783,439 B2 * | 10/2023 | Halasz | ................... | G06Q 50/18 705/311 |
| 11,954,098 B1 * | 4/2024 | Hron, II | ................ | G06F 16/285 |

(Continued)

OTHER PUBLICATIONS huggingface.co, "How to generate text: using different decoding methods for language generation with Transformers," Oct. 7, 2022, XP093149846, 7 pages. [online source] URL: https://web.archive.org//web/20221007034104/https://huggingface.co/blog/how-to-generate.

(Continued)

*Primary Examiner* — Hung D Le
(74) *Attorney, Agent, or Firm* — KDW Firm PLLC

(57) ABSTRACT

A document management system trains a machine learned model configured to facilitate contract generation. The document management system generates a training set for the machine learned model using user input. From a first set of agreement documents, the document management system identifies a first set of sentences relevant to clause terms input by the user. The document management system identifies, from a second set of agreement documents, a second set of sentences similar to the first set of sentences. In response to user feedback about the second set of sentences, the document management system updates the training set. The document management system retrains the machine learned model using the updated training set.

16 Claims, 9 Drawing Sheets

(56) References Cited

U.S. PATENT DOCUMENTS

| | | | |
|---|---|---|---|
| 2008/0235577 A1* | 9/2008 | Veluchamy | G06F 21/6209 715/268 |
| 2011/0055206 A1* | 3/2011 | Martin | G06F 40/289 707/723 |
| 2014/0164542 A1* | 6/2014 | McCabe | G06Q 10/10 709/206 |
| 2018/0268506 A1* | 9/2018 | Wodetzki | G06N 20/00 |
| 2020/0042531 A1* | 2/2020 | Bhojarajan | G06F 16/258 |
| 2020/0184330 A1* | 6/2020 | Walters | G06N 3/045 |
| 2020/0184584 A1* | 6/2020 | Farivar | G06V 10/764 |
| 2020/0327151 A1* | 10/2020 | Coquard | G06F 16/3347 |
| 2020/0327172 A1* | 10/2020 | Coquard | G06F 16/9035 |
| 2021/0150653 A1* | 5/2021 | Hjertstedt | G06F 40/166 |
| 2021/0201013 A1* | 7/2021 | Makhija | G06V 30/414 |
| 2021/0350227 A1* | 11/2021 | Thanabalan | G06Q 50/18 |
| 2021/0350276 A1* | 11/2021 | Ashlock | G06F 18/214 |
| 2022/0004713 A1* | 1/2022 | Han | G06V 30/413 |
| 2022/0261711 A1* | 8/2022 | Krishna | G06Q 50/188 |
| 2022/0318500 A1 | 10/2022 | Prasad | |
| 2022/0353296 A1* | 11/2022 | Louie | G06F 21/6209 |
| 2022/0391429 A1* | 12/2022 | Spierer | G06F 40/137 |
| 2023/0186667 A1* | 6/2023 | Goyal | G06N 3/044 382/181 |
| 2023/0237570 A1* | 7/2023 | Li | G06Q 40/03 705/38 |
| 2023/0244689 A1* | 8/2023 | Hanby, IV | G06N 20/00 707/756 |
| 2023/0245254 A1* | 8/2023 | Ramoutar | H04L 9/3247 705/80 |
| 2023/0289373 A1* | 9/2023 | Finkenberg | G06F 16/338 |
| 2024/0054281 A1* | 2/2024 | Bensoussan | G06V 30/19173 |
| 2024/0086651 A1* | 3/2024 | GoGwilt | G06F 40/166 |
| 2024/0193127 A1* | 6/2024 | Singh | G06F 16/164 |

OTHER PUBLICATIONS huggingface.co, "What is Text Generation?—Hugging Face," Nov. 29, 2022, XP093149839, [online sorce] URL: https://web.archive.org/web/20221129091032/https://huggingface.co/tasks/text-generation.

International Search Report and Written Opinion for International Application No. PCT/US2024/011812, mailed on Apr. 23, 2024, 15 pages.

* cited by examiner

Document Management System Dashboard

MASTER SERVICES AGREEMENT between ABC Technologies and XYZ Consulting

Intellectual Property
All intellectual property and related materials, including but not limited to, moral rights, goodwill, trade secrets, applications for registrations or relevant registration, rights to any trademark, trade dress, patent, copyright, trade name, and industrial design that is produced or developed under this Service Agreement Choice of Law
This agreement Text Suggestions ① is the sole property of ABC Technologies.

② is the sole property of XYZ Consulting.

① shall be governed in all respects by the laws of the State of California.

② shall be governed in all respects by the laws of the State of California, without regard to any conflicts of law provision or rule thereof that would result in the application of the laws of any other jurisdiction.

Figure 4B:
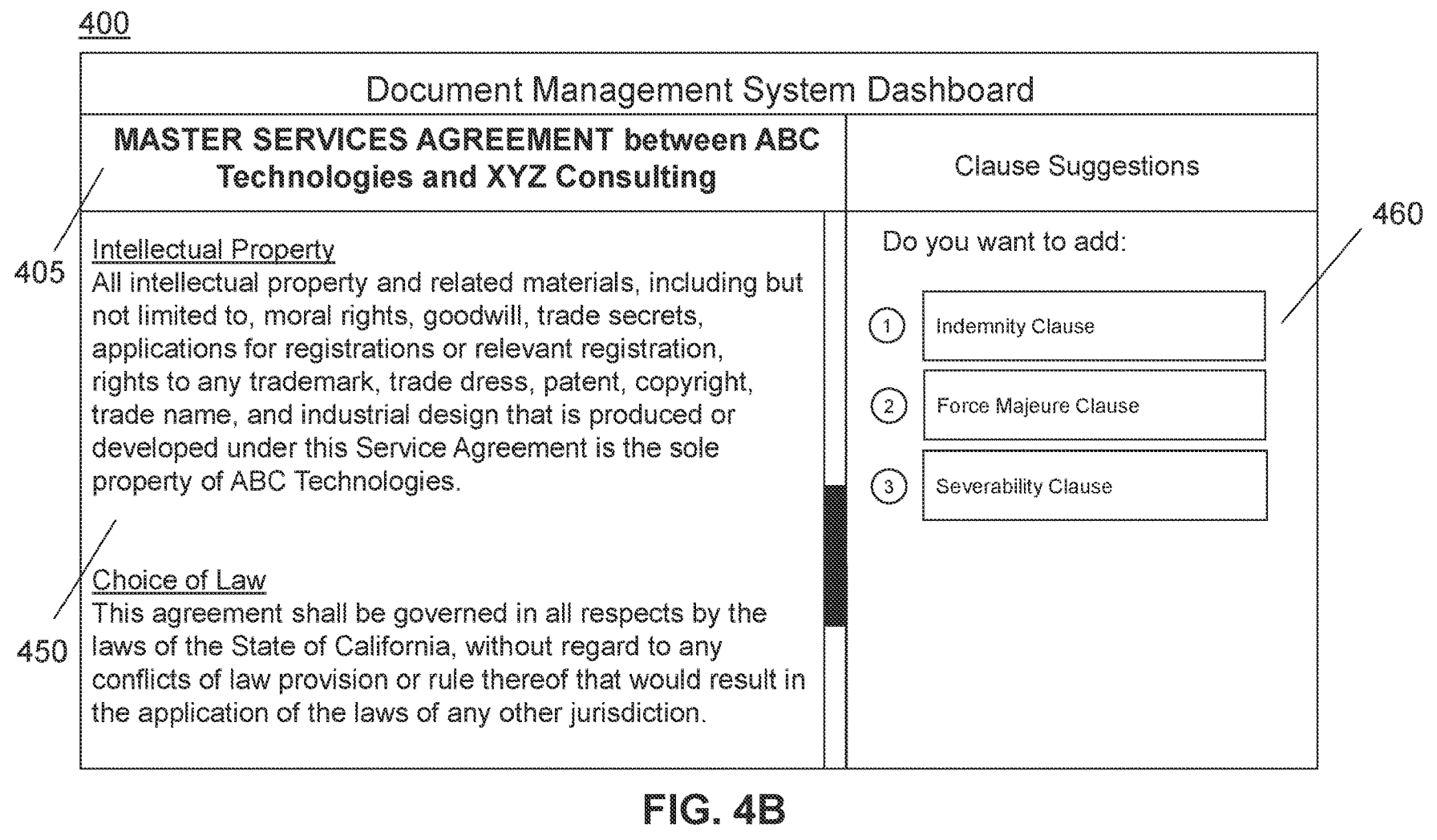

Document Management System Dashboard

MASTER SERVICES AGREEMENT between ABC Technologies and XYZ Consulting — 405

Intellectual Property
All intellectual property and related materials, including but not limited to, moral rights, goodwill, trade secrets, applications for registrations or relevant registration, rights to any trademark, trade dress, patent, copyright, trade name, and industrial design that is produced or developed under this Service Agreement is the sole property of ABC Technologies.

Choice of Law — 450
This agreement shall be governed in all respects by the laws of the State of California, without regard to any conflicts of law provision or rule thereof that would result in the application of the laws of any other jurisdiction.

Clause Suggestions — 460

Do you want to add:

① Indemnity Clause

② Force Majeure Clause

③ Severability Clause

Baseline

Either party shall be excused from performance and shall not be in default in respect of any obligation hereunder to the extent that the failure to perform such obligation is due to a pandemic or natural Force Majeure event.

630

This is your baseline for clause comparisons.

Similarity: 78%

The party affected by a Force Majeure event shall give notice to the other party as soon as reasonably possible of the Force Majeure event and the expected duration of the Force Majeure event.

Provide your feedback.

670

660

Similarity: 92%

If by reason of Force Majeure, either party hereto shall be rendered unable wholly or in part to carry out its obligations under this Agreement, such party shall give notice in writing to the other party and shall not be found in default.

Thanks for your feedback!

680

Similarity: 53%

BIG CO. shall be obliged to pay only the newly identified amount of the difference between the originally agreed upon contractual amount and the re-evaluated amount within 30 days of a written request to the organizer.

Provide your feedback.

MACHINE LEARNED MODEL FOR CONTRACT GENERATION IN A DOCUMENT MANAGEMENT SYSTEM

TECHNICAL FIELD

The disclosure generally relates to the field of document management, and specifically to training a machine learned model for contract generation in document management systems.

BACKGROUND

Online document management systems can be used to create and review documents and may provide users with tools to edit, view, and execute the documents. Conventional document management systems require users to manually create documents. There is a need to provide users with improved and efficient document creation processes.

SUMMARY

A document management system uses machine learning to help improve the contract generation process.

The document management system identifies a first set of agreement documents associated with a received set of clause terms. The document management system identifies a first set of sentences within the first set of agreement documents that include a threshold number of the received set of clause terms. The document management system generates a training language set based on the identified first set of sentences and trains a machine learned language model using the training language set. From a second set of agreement documents associated with a subject, the document management system identifies a second set of sentences using the machine learned language model. The document management system presents, on a user interface, each of the second set of sentences to a user. The document management system updates the training language set by receiving a selection of a presented sentence from the second set of sentences, adding the selected sentence to the training language set, and replacing the selected sentence presented within the user interface with another sentence from the same agreement document. The document management system then retrains the machine learned language model using the updated training language set.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Figure (FIG. 1 is a high-level block diagram of a system environment for a document management system, in accordance with an example embodiment.

FIGS. 4A-B illustrate an interface of the document management system with ranked predictive text suggestions for contract generation, in accordance with an example embodiment.

FIGS. 6A-B illustrate an interface of the document management system used to generate a training set for the machine learned model, in accordance with an example embodiment.

DETAILED DESCRIPTION

Figure 1:
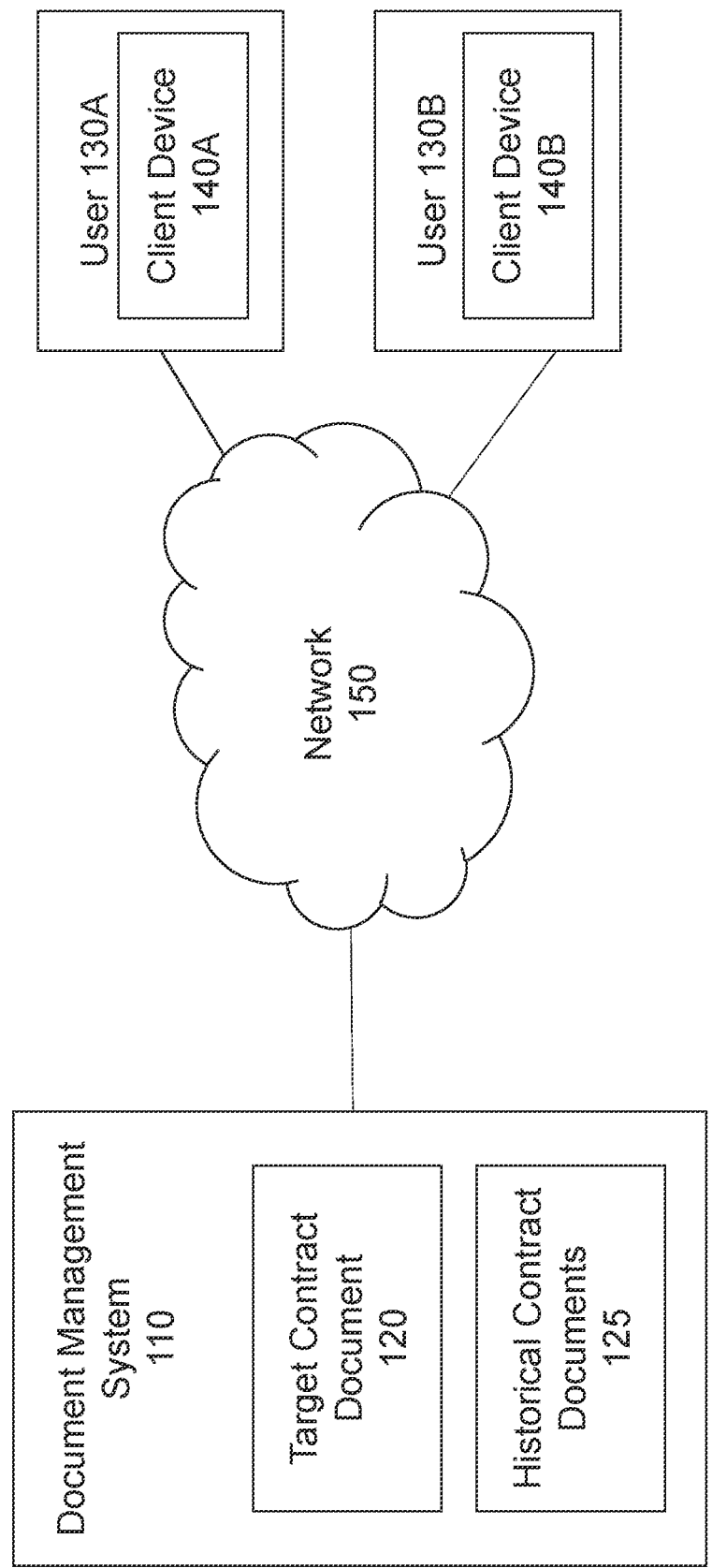

The Figures (FIGs.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. A letter after a reference numeral, such as "120A," indicates that the text refers specifically to the element having that particular reference numeral. A reference numeral in the text without a following letter, such as "120," refers to any or all of the elements in the figures bearing that reference numeral.

The figures depict embodiments of the disclosed system (or method) for purposes of illustration only. One skilled in the art will readily recognize from the following description that alternative embodiments of the structures and methods illustrated herein may be employed without departing from the principles described herein.

Document Management System Over View

A document management system enables a party (e.g., individuals, organizations, etc.) to create and send documents to one or more receiving parties for negotiation, collaborative editing, electronic execution (e.g., via electronic signatures), contract fulfilment, archival, analysis, and more. For example, the document management system allows users of the party to create, edit, review, and negotiate document content with other users and other parties of the document management system.

The system environment described herein can be implemented within the document management system, a document execution system, or any type of digital transaction management platform. It should be noted that although description may be limited in certain contexts to a particular environment, this is for the purposes of simplicity only, and in practice the principles described herein can apply more broadly to the context of any digital transaction management platform. Examples can include but are not limited to online signature systems, online document creation and management systems, collaborative document and workspace systems, online workflow management systems, multi-party communication and interaction platforms, social networking systems, marketplace and financial transaction management systems, or any suitable digital transaction management platform.

Conventional systems require that users manually type out contract documents. The methods described herein use machine learning to improve the document generation experience for users of the document management system. A user provides initial text input into a contract document. The document management system uses a machine learned model to rank a set of predictive text suggestions based on a likelihood that each suggestion will be selected to complete the initial text input. The document management system presents the top ranked text suggestions to the user, who selects at least one of the text suggestions. The document management system modifies the document interface to include the selected suggestion.

The document management system generates the language set used to train the machine learned model with the user's input. The document management system finds clauses in existing documents that are contextually related to the initial text input, receives the user's feedback on those clauses, and adds user approved contextually related clauses to the training set. The machine learned model is retrained as the training set is updated.

FIG. 1 is a high-level block diagram of a system environment 100 for a document management system 110, in accordance with an example embodiment. The system environment 100 enables users 130A-B to generate documents more efficiently with the document management system 110. As illustrated in FIG. 1, the system environment 100 includes a document management system 110, which has a target contract document 120 and historical contract documents 125, users 130A-B, and corresponding client devices 140A-B, each communicatively interconnected via a network 150. In some embodiments, the system environment 100 includes components other than those described herein. For clarity, although FIG. 1 only shows two users 130A-B and two client devices 140A-B, alternate embodiments of the system environment 100 can have any number of users and client devices. For the purposes of concision, the web servers, data centers, and other components associated with an online system environment are not shown in FIG. 1.

The document management system 110 is a computer system (or group of computer systems) for storing and managing documents for the users 130A-B. Using the document management system 110, users 130A-B can collaborate to create, edit, review, store, analyze, manage, and negotiate documents, including the target contract document 120 and historical contract documents 125. The target contract document 120 is a new document that a user (e.g., one of the users 130A-B) seeks to generate. The user and/or document management system 110 designates characteristics of the target contract document 120. For example, the target contract document 120 may be a specific type of contract, such as an employment agreement, purchase agreement, service agreement, financial agreement, master services agreement, intellectual property licensing agreement, and so on. In other embodiments, the target contract document 120 is another type of document, such as a press release or a technical specification. The document management system 110 stores one or more historical contract documents 125. These historical contract documents 125 may be specific to the users 130A-B or an entity associated with the document management system 110.

The document management system 110 can be a server, server group or cluster (including remote servers), or another suitable computing device or system of devices. In some implementations, the document management system 110 can communicate with client devices 140A-B over the network 150 to receive instructions and send documents (or other information) for viewing on client devices 140A-B. The document management system 110 can assign varying permissions to individual users 130A-B or groups of users controlling which documents each user can interact with and what level of control the user has over the documents they have access to. The document management system 110 will be discussed in further detail with respect to FIG. 2.

Users 130A-B of the client devices 140A-B can perform actions relating to documents stored within the document management system 110. Each client device 140A-B is a computing device capable of transmitting and/or receiving data over the network 150. Each client device 140A-B may be, for example, a smartphone with an operating system such as ANDROID® or APPLE® IOS®, a tablet computer, laptop computer, desktop computer, or any other type of network-enabled device from which secure documents may be accessed or otherwise interacted with. In some embodiments, the client devices 140A-B include an application through which the users 130A-B access the document management system 110. The application may be a stand-alone application downloaded by the client devices 140A-B from the document management system 110. Alternatively, the application may be accessed by way of a browser installed on the client devices 140A-B and instantiated from the document management system 110. The client devices 140A-B enables the users 130A-B to communicate with the document management system 110. For example, the client devices 140A-B enables the users 130A-B to access, review, execute, and/or analyze documents within the document management system 110 via a user interface. In some implementations, the users 130A-B can also include AIs, bots, scripts, or other automated processes set up to interact with the document management system 110 in some way. According to some embodiments, the users 130A-B are associated with permissions definitions defining actions users 130A-B can take within the document management system 110, or on documents, templates, permissions associated with other users and/or workflows.

The network 150 transmits data within the system environment 100. The network 150 may be a local area or wide area network using wireless or wired communication systems, such as the Internet. In some embodiments, the network 150 transmits data over a single connection (e.g., a data component of a cellular signal, or Wi-Fi, among others), or over multiple connections. The network 150 may include encryption capabilities to ensure the security of customer data. For example, encryption technologies may include secure sockets layers (SSL), transport layer security (TLS), virtual private networks (VPNs), and Internet Protocol security (IPsec), among others.

Figure 2:
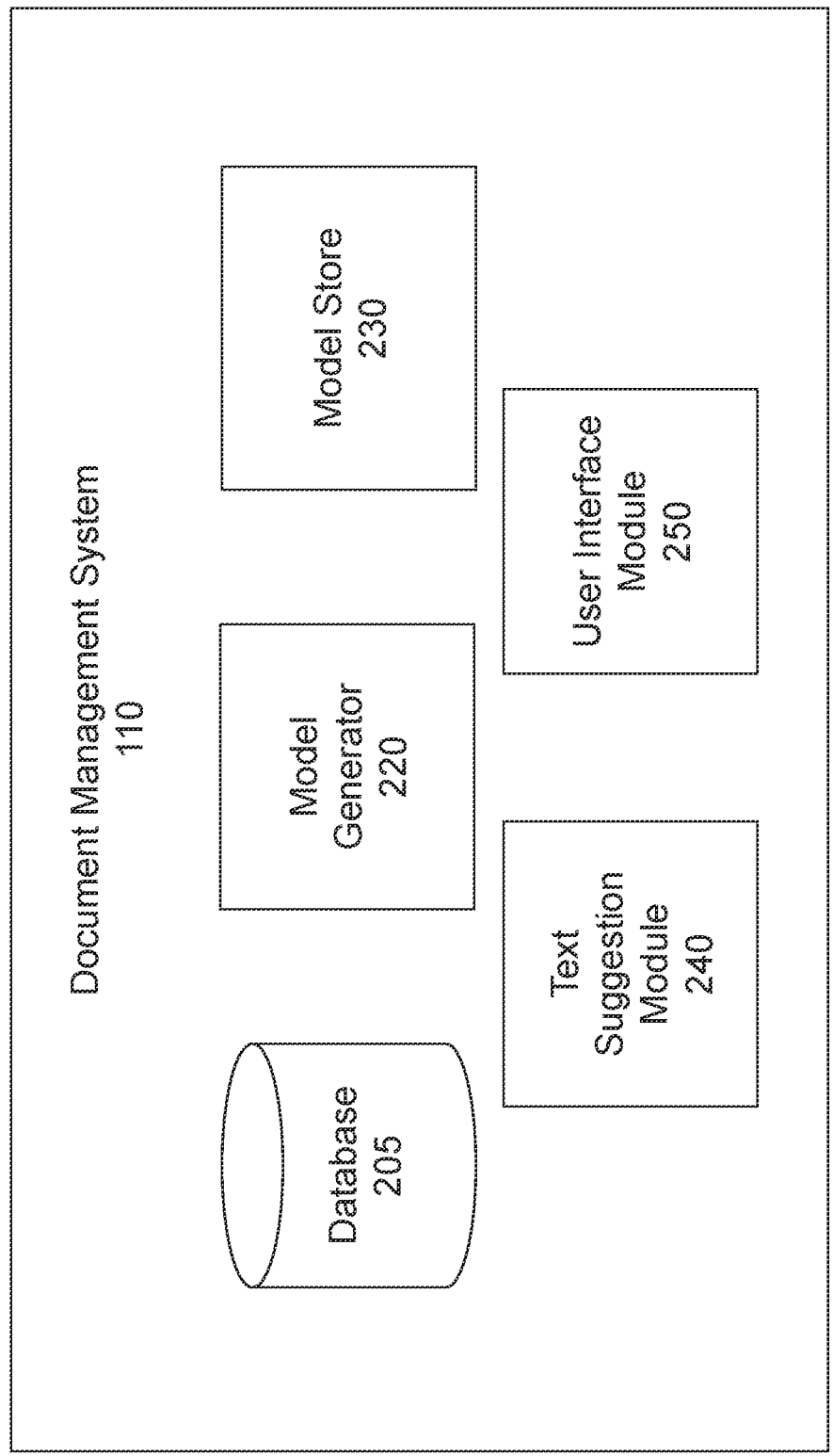
FIG. 2 is a high-level block diagram of a system architecture of the document management system, in accordance with an example embodiment.

FIG. 2 is a high-level block diagram of a system architecture of the document management system 110, in accordance with an example embodiment. To facilitate contract generation, the document management system 110 includes a database 205, a model generator 220, a model store 230, a text suggestion module 240, and a user interface module 250. Computer components such as web servers, network interfaces, security functions, load balancers, failover servers, management and network operations consoles, and the like may not be shown so as to not obscure the details of the system architecture. The document management system 110 may contain more, fewer, or different components than those shown in FIG. 2 and the functionality of the components as described herein may be distributed differently from the description herein.

The database 205 stores information relevant to the document management system 110. The database 205 can be implemented on a computing system local to the document management system 110, remote or cloud-based, or using any other suitable hardware or software implementation. The data stored by the database 205 may include, but is not limited to, the target contract document 120, the historical contract documents 125, portions of text corresponding to the historical contract documents 125, information about users (e.g., the users 130A-B), information about one or more entities associated with users, client device identifiers (e.g., of the client devices 140A-B), document clauses, document templates, version histories, and other information stored by the document management system 110. In some embodiments, the database 205 stores metadata associated with documents or portions of documents, such as users who modified the documents, entities associated with the documents, parties who signed the documents, and so on. The document management system 110 can update information stored in database 205 as new information is received, such as new documents and feedback from users received via the user interface module 250. Updates to machine learned models are also stored in the database 205.

The model generator 220 trains machine learned models. To facilitate contract generation, the model generator 220 uses the historical contract documents 125 to train a machine learned model that is configured to rank predictive text suggestions based on their relevance to initial user input. Specifically, the machine learned model ranks the text suggestions based on a likelihood that each text suggestion will be selected to complete a user's initial text portion into a contract document. In some embodiments, the machine learned model ranks the text suggestions based on characteristics of the contract document. In some embodiments, the model generator 220 retrains models stored in the model store 230 periodically, or as new training data is received. Additional details about the machine learned model are provided with respect to FIG. 3.

The model store 230 stores machine learned models for the document management system 110, including those generated by the model generator 220. In some embodiments, the model store 230 may store various versions of models as they are updated over time. In other embodiments, the model store 230 may store multiple versions of a type of model, for example, to apply to different document types or to other variations of available inputs. In the example herein, the model store 230 stores the machine learned model configured to rank predictive text suggestions based on initial user input to facilitate contract generation.

The text suggestion module 240 uses the trained machine learned model, stored in the model store 230, to generate contract documents in the document management system 110. The text suggestion module 240 receives user input of an initial text portion into a contract document. The initial text portion may be, for example, a word, a sentence, or a paragraph corresponding to a contract. The text suggestion module 240 also identifies one or more characteristics of the contract document, such as a type of the contract document, one or more entities or parties associated with the contract document, and so on.

The text suggestion module 240 generates a database of contract text portions from the historical contract documents 125 and from this database, identifies a candidate set of text portion suggestions that are relevant to the user's initial text portion. In some embodiments, the database of contract text portions is specific to the user who provided the initial text portion. In other embodiments, the database of contract text portions is specific to an entity associated with the document management system 110 or to which the user belongs. The text suggestion module 240 may use a machine learned model to identify the relevant candidate set of text portion suggestions.

The text suggestion module 240 subsequently applies the trained machine learned model to the candidate set of text portion suggestions. The trained machine learned model takes as additional input the user's initial text portion and characteristics of the contract document, generating a set of top ranked text portion suggestions. The ranking is based on a likelihood that each text portion suggestion will be selected to complete the user's initial text portion, while factoring in the characteristics of the contract document. The text suggestion module 240 presents the top ranked text portion suggestions to the user and in some embodiments, the level of risk associated with each of these suggestions. After a user selects at least one of the top ranked text portion suggestions, the text suggestion module 240 modifies the contract document with the selected text portion suggestion. In some embodiments, the user provides feedback as to the accuracy and relevance of the top ranked text portion suggestions. Based on the feedback, the text suggestion module 240 modifies the ranking of the text portion suggestions or provides the feedback back to the model generator 220 to retrain the machine learned model.

For example, the text suggestion module 240 may receive, from a user, a first sentence of an indemnity clause in a contract document designated to be a Master Services Agreement. The first sentence of the indemnity clause is the initial text portion; the type of the document (i.e., the Master Service Agreement) is a characteristic of the contract document. The text suggestion module 240 generates a candidate set of text portion suggestions relevant to the first sentence of the indemnity clause. The machine learned model ranks each of the text portion suggestions based on a likelihood that the user will select each text portion suggestion to complete the remainder of the indemnity clause in the Master Services Agreement. The text suggestion module 240 subsequently presents the top ranked text portion suggestions to the user, who selects at least one suggestion. The text suggestion module 240 modifies the contract document to include the selected suggestion, completing the indemnity clause.

The user interface module 250 generates user interfaces for users (e.g., the users 130A-B) to interact with the document management system 110. The user interface module 250 receives input from the user and presents text suggestions received from the text suggestion module 240 to the user. The input from the user includes the initial text portion as well as feedback as to the relevance and accuracy of the text portion suggestions. The user interface module 250 also provides a user interface for users to add, delete, or modify the contents of the target contract document 120, the historical contract documents 125, and other documents stored in the document management system 110. In some embodiments, the user interface module 250 may provide a user interface that allows users to modify content such as text, images, links to outside sources of information such as databases, and the like.

Generating Predictive Text Suggestions Using Machine Learning

Figure 3:
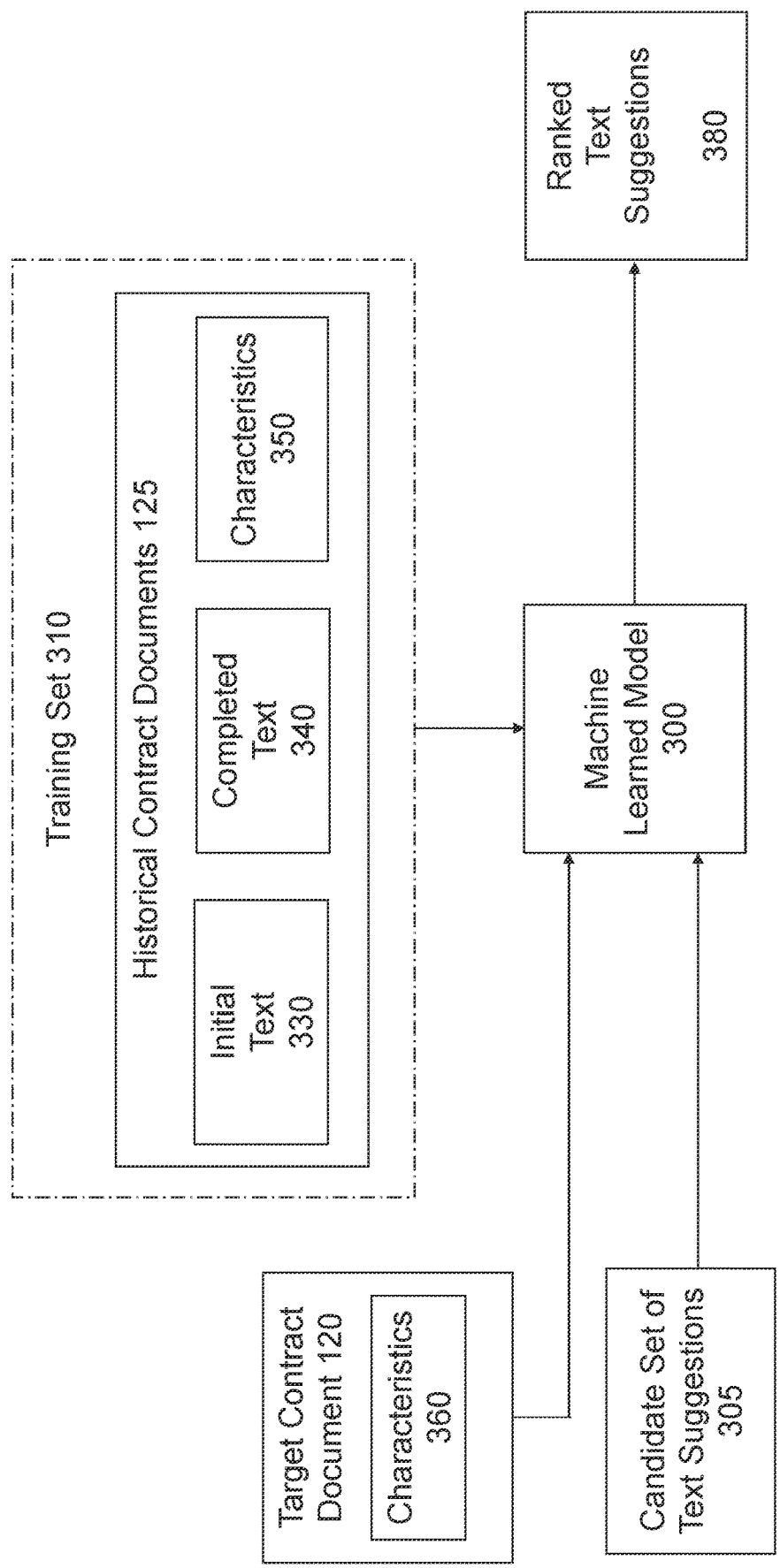
FIG. 3 illustrates training and applying a machine learned model configured to rank predictive text suggestions for contract generation, in accordance with an example embodiment.

FIG. 3 illustrates training and applying a machine learned model 300 configured to rank predictive text suggestions for contract generation, in accordance with an example embodiment. As described with respect to FIG. 2, the document management system 110 receives initial text from a user, input into the target contract document 120. The document management system 110 (e.g., via the text suggestion module 240) identifies a candidate set of text suggestions 305 from the historical contract documents 125. Each of the text suggestions in the candidate set of text suggestions 305 is relevant to the initial text from the user. The machine learned model 300 (e.g., trained by the model generator 220 and stored in the model store 230) takes, as input, the set of candidate text suggestions 305 as well as characteristics 360 of the target contract document 120. The machine learned model 300 ranks the candidate set of text suggestions 305 based on the characteristics 360 of the target contract document 120 and a likelihood that each text portion suggestion will be selected to complete the initial text.

The model generator 220 uses a training set 310 to train the machine learned model 300. The training set 310 comprises the historical contract documents 125, each of which includes one or more portions of text labeled as initial text 330 or completed text 340. The initial text 330 may be a word, a phrase, a sentence, a clause, a paragraph, a heading, and so on. The completed portion 340 corresponds to and follows the initial text 330. For example, the completed portion 340 is the remainder of the phrase, sentence, or clause that was started by the initial text 330. Each historical contract document 125 is also associated with one or more characteristics 350. Characteristics include, for example, a type of the contract document, one or more parties to the contract document, characteristics of one or more entities associated with the contract document, and characteristics of one or more users associated with the contract document. Examples of characteristics of an entity associated with the document include a legal type of the entity, an industry of the entity, and a jurisdiction associated with the entity. In some embodiments, the training set 310 further includes a level of risk associated with each text portion in each of the historical contract documents 125. The document management system 110 automatically generates the training set 310 by labeling portions of the historical contract documents 125.

The document management system 110 may generate the training set 310 with user feedback. For example, users of the document management system 110 may manually label the initial text 330, the completed text 340, and the characteristics 350 of each of the historical contract documents 125. In other embodiments, the document management system 110 identifies a first set of sentences (and/or clauses) within a subset of the historical contract documents 125 that include a threshold number of the terms initially input by the user (e.g., in the initial text 330). The document management system 110 identifies a second set of sentences (and/or clauses) from a second subset of the historical contract documents 125 that are similar to the first set of sentences. The user provides input on whether to add each of the sentences in the second set to the training set 310. Accordingly, the training set 310 may be dynamically updated with user input. This embodiment is further described with respect to FIGS. 6-7.

The model generator 220 uses the training set 310 to train the machine learned model 300. The machine learned model 300 learns to draw conclusions from relationships between the data in the training set 310. Specifically, the machine learned model 300 learns to relate initial portions of text to completed portions of text in the historical contract documents 125. For example, the machine learned model 300 may learn that the word "intellectual" is always followed by the word "property" in agreements, or that the initial text "trade" has a higher likelihood of being completed as "trademark" than "trade secret." In another example, the machine learned model 300 may predict that an intellectual property provision in a service agreement always includes "patents, copyrights, trademarks, and trade secrets."

The machine learned model 300 learns to make connections between portions of text in the historical contract documents 125 and the documents' authors and associated entities. For example, the machine learned model 300 may learn that a high percentage of service agreements created by an entity associated with the document management system 110 include indemnity clauses. The machine learned model 300 may learn that when an entity authors a licensing agreement for use outside of the United States, the entity prefers a licensing term of less than 5 years. In another example, the machine learned model 300 may recognize that a particular user consistently prefers agreements to be governed by the laws of California, as stated in choice of law provisions in agreements authored by the user.

The model generator 220 may use different versions of supervised or unsupervised machine learning, or another training technique to generate and update the machine learned model 300. In some embodiments, other training techniques may be linear support vector machines (linear SVM), boosting for other algorithms (e.g., AdaBoost), neural networks, logistic regression, naïve Bayes, memory based learning, random forests, bagged trees, decision trees, boosted trees, boosted stumps, and so on. After training, the machine learned model 300 is applied to the characteristics 360 of the target contract document 120 and the candidate set of text suggestions 305. The machine learned model 300 outputs a set of ranked text suggestions 380 that are likely to be selected by the user to complete the initial text from the user.

In determining its output, the machine learned model 300 may additionally be trained on and factor in characteristics of the user, risk levels of the text suggestions, and a type of the initial text from the user. Characteristics of the user may include a position of the user within an entity associated with the document management system 110, types of documents the user has worked on in the past, and so on. Risk levels of each of the text suggestions may be determined based on prior litigation history associated with a particular clause or portion of text surrounding the text suggestion. In some embodiments, risk levels may be determined by how frequently the text suggestion appears in the historical contract documents 125 or based on input of a level of risk from the user and/or the entity associated with the user. In other embodiments, the greater the monetary value associated with or included in a text suggestion, the greater the level of risk. The type of the initial text from the user may impact the relevance of certain predictive text suggestions. For example, if the initial text is a heading (e.g., a heading for a choice of law provision), the machine learned model may determine that a paragraph corresponding to the heading (e.g., the completed choice of law clause) is more likely to be selected by the user than a sentence corresponding to the heading (e.g., the first sentence of a choice of law clause).

Example Document Management System Interface

FIGS. 4A-B illustrate an interface 400 of the document management system 110 with ranked predictive text suggestions for contract generation, in accordance with an example embodiment. A first portion of the interface 400 shows a target contract document 405, a Master Services Agreement, with initial text from a user. The initial text portion 410 is an incomplete paragraph corresponding to an intellectual property provision of the agreement. The initial text portion 420 is an incomplete sentence corresponding to a choice of law provision of the agreement. A second portion of the interface 400 shows ranked text suggestions 430 and 440. The ranked text suggestions 430 are suggested to complete the paragraph in the initial text portion 410; the ranked text suggestions 440 are suggested to complete the clause in the initial text portion 420. As shown in FIG. 4B, the document management system 110 will modify the interface 400 to include the user's selections of the ranked text suggestions 430 and 440, completing the initial text portions 410 and 420, respectively. In some embodiments, the document management system 110 designates one or more provisions in the target contract document 405 as the initial text portion 450. Accordingly, the document management system 110 presents clause suggestions 460 on the interface 400 based on their relevance to the target contract document 405. The example herein shows that the document management system 110 suggests adding an indemnity clause, force majeure clause, or a severability clause following the initial text portion 450, the choice of law clause, based on the likelihood that the user would select each clause suggestion to follow the initial text portion 450. In some embodiments, the document management system 110 may suggest clauses within a particular clause category (e.g., types of indemnity clauses).

Example Document Generation Workflow

Figure 5:
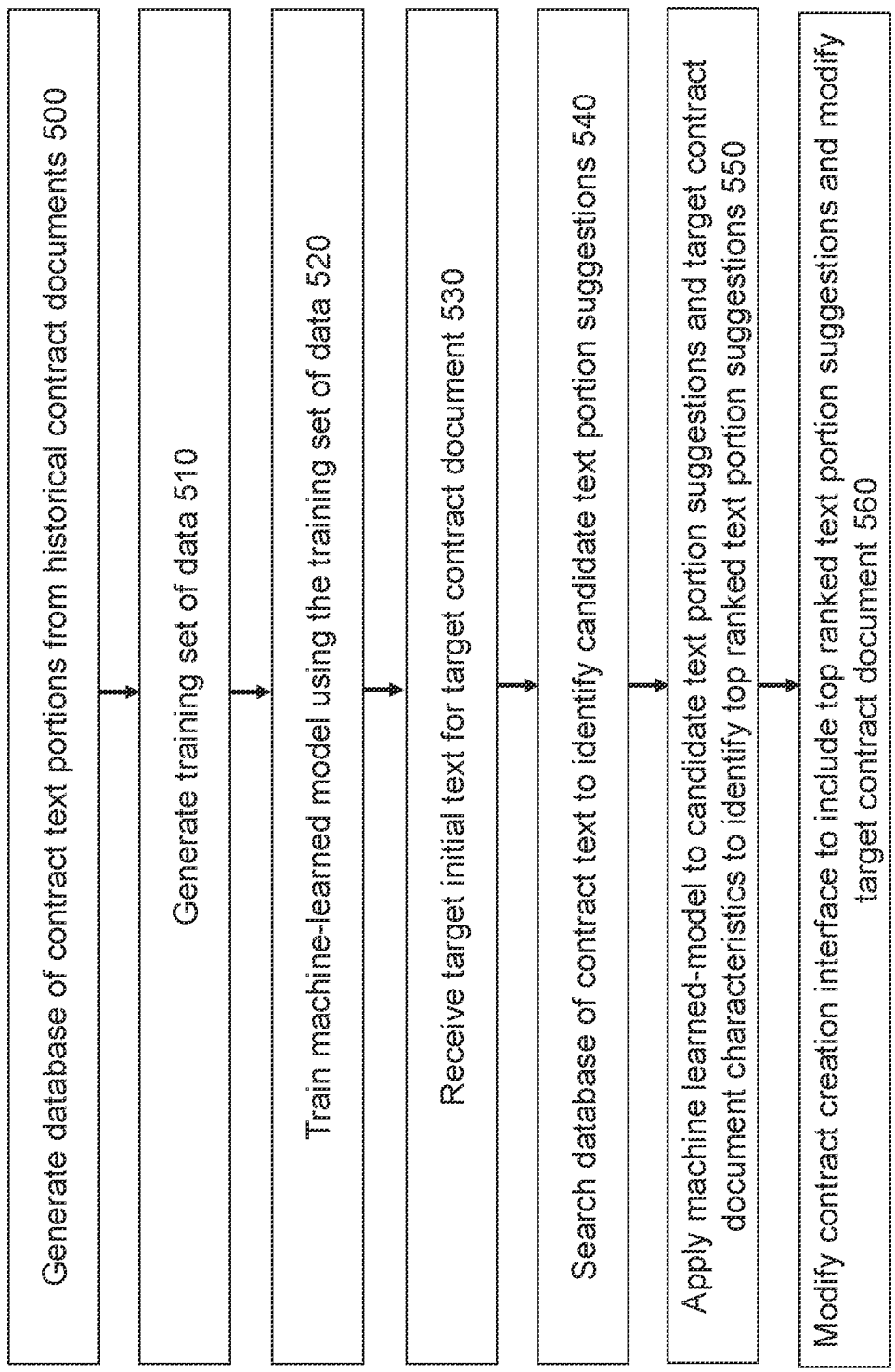
FIG. 5 illustrates an example process for ranking predictive text suggestions for contract generation in the document management system, in accordance with an example embodiment.

FIG. 5 illustrates an example process for ranking predictive text suggestions for contract generation in the document management system, in accordance with an example embodiment. The document management system (e.g., the document management system 110) generates 500 a database of contract text portions from historical contract documents (e.g., the historical contract documents 125).

The document management system generates 510 a training set (e.g., the training set 310) of data from the historical contract documents. For each historical contract document, the training set includes one or more initial text portions (e.g., initial text 330) within the historical contract document and for each initial text portion, a corresponding completed text portion (e.g., completed text 340) that includes the initial text portion. Additionally, the training set includes characteristics associated with each historical contract document and characteristics of entities associated with the historical contract document (e.g., characteristics 350).

The document management system trains 520 a machine learned model (e.g., the machine learned model 300) using the training set of data. The machine learned model is configured to rank a set of text portion suggestions based on a likelihood that each text portion suggestion will be selected as a completed text portion for an initial text portion received in the creation of a contract document. The machine learned model's output may also be based on the characteristics of the contract document.

The document management system receives 530 target initial text from a user seeking to create a new document (e.g., the target contract document 120). The initial text may range from one or more words to a heading. The document management system searches 540 the database of contract text portions for text portion suggestions that are relevant to the initial text. The result is a candidate set of text portion suggestions (e.g., the candidate set of text suggestions 305).

The document management system applies 550 the machine learned model to the candidate set of text portion suggestions and to characteristics of the target contract document (e.g., characteristics 360) to identify a set of top ranked text portion suggestions.

The document management system modifies 560 a contract creation interface (e.g., the interface 400) to include the identified set of top-ranked text portion suggestions (e.g., ranked text suggestions 380). After the user selects the most relevant text portion suggestion, the target contract document is modified to include the selected text portion suggestion.

Using Machine Learning to Generate a Training Language Set

Figure 6A:
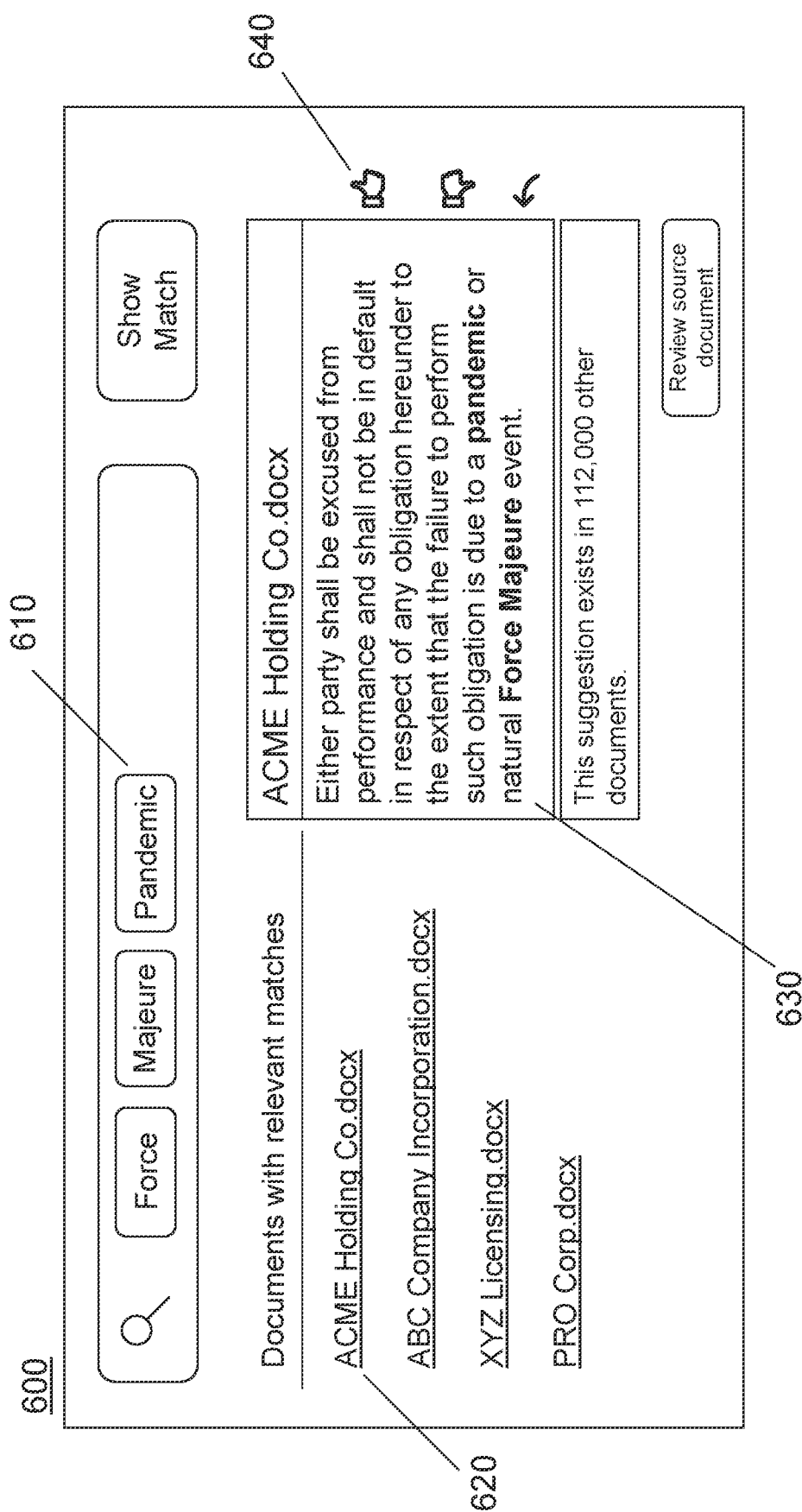

FIGS. 6A-B illustrate an interface 600 of the document management system 110 used to generate a training set for the machine learned model 300, in accordance with an example embodiment. As described with respect to FIG. 3, the machine learned model 300 is trained with the training set 310. In one embodiment, the training set 310 is dynamically updated using input from a user and the output of the machine learned model 300 itself.

The document management system 110 receives a set of clause terms 610 from the user via the interface 600. The clause terms may be part of and/or separate from the initial text portion (e.g., the initial text 330) input by the user. For example, as illustrated in FIG. 6A, the user may input the clause terms "force," "majeure," and "pandemic" to identify force majeure provisions in agreement documents that include the word "pandemic."

The document management system 110 searches a first set of agreement documents using the set of clause terms 610 to identify a set of relevant matches 620 (e.g., agreement documents that include a threshold number of the set of clause terms). The first set of agreement documents comprises a subset of the historical contract documents 125. For example, the document management system 110 may identify a threshold number of relevant matches 620. This threshold number may be set by the user, and/or based on the type and/or number of clause terms input by the user. In another example, the document management system 110 may identify relevant matches 620 from historical contract documents 125 associated with the user (e.g., who input the clause terms), an entity associated with the user, agreement documents in the public domain, or some combination thereof.

The document management system 110 identifies a set of sentences, clauses, phrases, paragraphs, terms, or any other text portions ("sentences" hereafter) 630 that include a threshold number of the clause terms input by the user. For example, as demonstrated in FIG. 6A, the document management system 110 may identify clauses from the first set of agreement documents that include all of the clause terms input by the user, while in other embodiments, the document management system may identify clauses that include most or just some of the inputted clause terms.

In some embodiments, the threshold number of clause terms used to identify the set of sentences 630 may be set by the user and/or an entity associated with the user. In other embodiments, the document management system 110 determines the threshold value based on the type of clause terms and/or agreement documents associated with the clause terms. In some embodiments, the document management system 110 identifies the set of sentences based on other factors. For example, the user may specify that the set of sentences must be associated with a particular entity, a monetary value, a jurisdiction, any other suitable characteristic, or some combination thereof. In this example, only sentences that are associated with (for instance) a particular entity that also include a threshold number of the inputted clause terms are included in the identified set of sentences.

The document management system 110 presents the relevant matches 620 and the identified set of sentences 630 to the user via the interface 600. The user may provide feedback 640 on the identified set of sentences 630 via the interface 600. For example, the user may approve or reject the identified set of sentences using corresponding interface elements. The user may also request that the document management system 110 present a new set of sentences, from either the same set of documents or from different documents that also include sentences associated with the inputted clause terms.

The document management system 110 generates a training set (e.g., the training set 310) based on the matches from the first set of agreement documents and trains the machine learned model 300 using the generated training set. The machine learned model 300 outputs a second set of sentences and/or clauses 660 that are relevant and/or similar to the clause terms input by the user. The second set of sentences 660 may be a subset of the candidate text suggestions 305, and the second set of sentences are identified from a second set of agreement documents associated with one or more subjects or document categories, such as legal paperwork, medical documents, medical reports, scientific papers, real estate agreements, employment agreements, court filings, business documents and/or agreements, and so on. In some embodiments, the user specifies the one or more subjects associated with the second set of agreement documents. In other embodiments, the document management system 110 selects the subjects based on the input clause terms and/or characteristics of the user.

The document management system 110 determines a measure of similarity and/or relevance between the set of sentences 630 and the second set of sentences 660. The document management system 110 presents the second set of sentences 660, as well as the measure of similarity 670, to the user via the interface 600. The user may request additional information about any agreement documents from which the second set of sentences 660 originate. The document management system 110 may accordingly present characteristics about these agreement documents on the interface 600. For example, the document management system 110 may display a context and/or author of the agreement document, an entity associated with the agreement document, and/or an industry associated with the agreement document.

The user may provide input 680 on each of the second set of sentences 660. The user input 680 may be positive or negative feedback about each of the sentences in the second set of sentences 660. In response to positive feedback 680 from the user about a presented sentence, the document management system 110 adds the presented sentence to the training set. The document management system 110 replaces the presented sentence with another sentence from the same agreement document (e.g., the agreement document from which the presented sentence originated).

In some embodiments, the document management system 110 replaces the presented sentence after receiving negative feedback 680 from the user, without adding the presented sentence to the training set. In response to presenting a threshold number of sentences from the same agreement document, or in response to receiving positive and/or negative feedback for a threshold number of sentences from the same agreement document, the document management system 110 may replace the second set of sentences 660 with sentences from another agreement document. In some embodiments, the user can manually request sentences from a different set of agreement documents. Accordingly, the training set is dynamically updated with user input identifying additional sentences to add to the training set from one or more documents. The document management system 110 the retrains the machine learned model 300 with updated training set.

Figure 7:
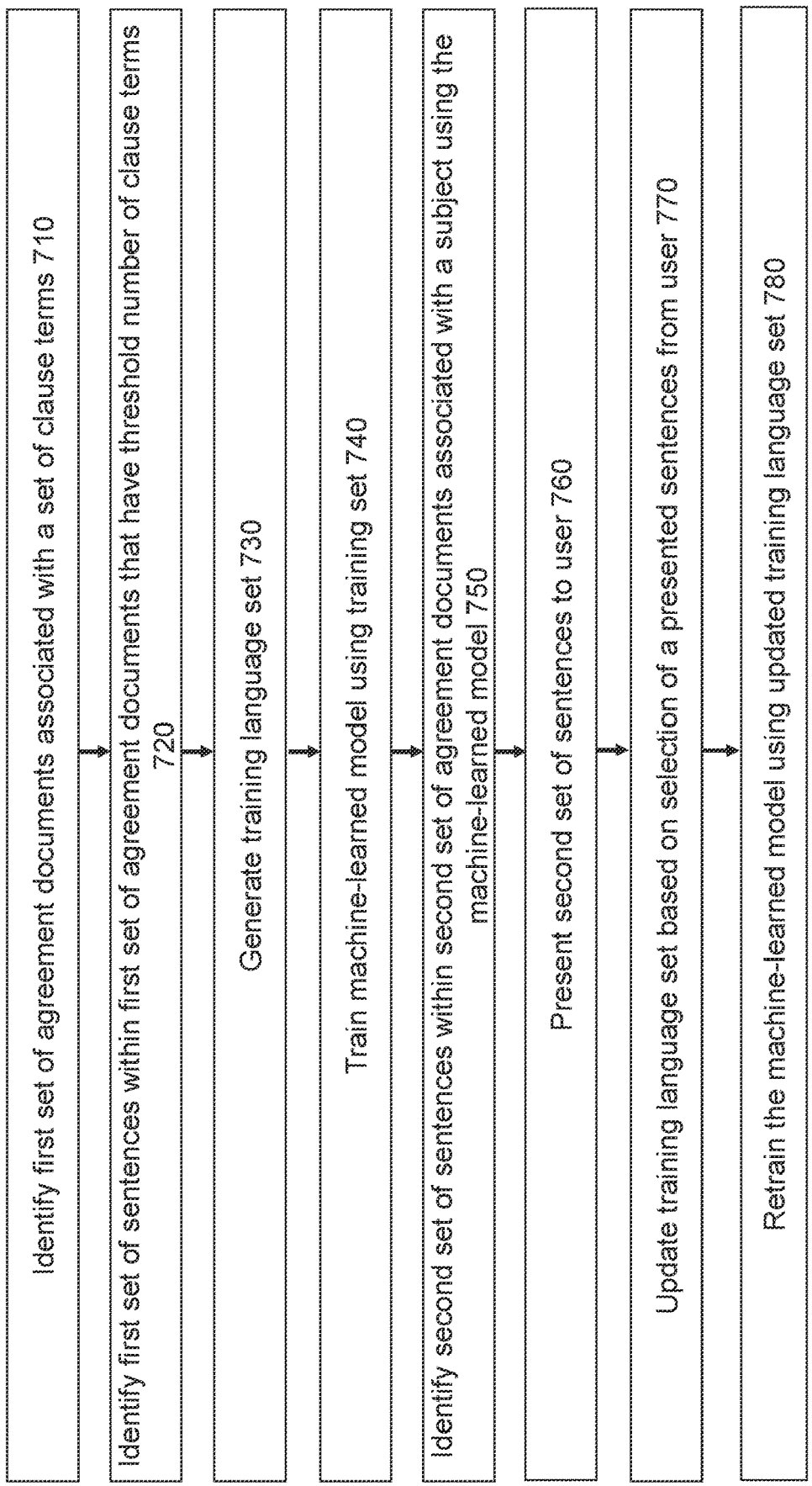
FIG. 7 illustrates an example process for training the machine learned model, in accordance with an example embodiment.

FIG. 7 illustrates an example process for training the machine learned model, in accordance with an example embodiment. The document management system (e.g., the document management system 110) identifies 710 a first set of agreement documents (e.g., a subset of the historical contract documents 125) associated with a received set of clause terms. A user (e.g., one of the users 130A-B) may input the clause terms to an interface (e.g., the interface 600) of the document management system.

The document management system identifies 720 a first set of sentences (e.g., the set of sentences 630) within the first set of agreement documents that include a threshold number of the received set of clause terms. The user may provide feedback (e.g., via user interface element 640) on the first set of sentences, for instance either approving or rejected sentences. It should be noted that although this example is described in terms of sentences, in practice, clauses, terms, paragraphs, or any other document portion can be presented to a user for feedback and/or inclusion in a training set.

The document management system generates 730 a training language set (e.g., the training set 310) based on the identified first set of sentences. In some embodiments, the training set includes each of the identified first set of sentences which have received positive feedback from a user, while in other embodiments, the training set includes all of the identified first set of sentences that didn't receive negative feedback from the user.

The document management system trains 740 a machine learned model (e.g., the machine learned model 300) using the training language set. For example, the machine learned model can be a neural network trained to identify sentences or clauses within documents based on terms provided by a user, and/or based on a subject identified by a user or inferred from the terms provided by the user.

Applying the machine learned model to a document corpus, the document management system identifies 750 a second set of sentences (e.g., the candidate set of text suggestions 305) from a second set of agreement documents within the document corpus. In some embodiments, the second set of agreement documents are each associated with a subject, for instance associated with key terms identified by a user.

The document management system presents 760 each of the plurality of the second set of sentences to the user within a corresponding portion of an interface. The user may provide feedback on each of the sentences in the second set of sentences using one or more interface elements, and can request additional sentences from a same document, or sentences from one or more different documents.

In response to receiving a selection of a presented sentence from the user, the document management system adds the selected sentence to the training language set. The document management system replaces the selected sentence from the interface with another sentence from the same agreement document. Accordingly, based on the selections received from the user, the document management system updates 770 the training language set.

The document management system retrains 780 the machine learned model using the updated training language set. The machine learned model can be retrained each time the training data set is updated, after the passage of a threshold amount of time, periodically, or at the request of user. The updated machine learned model can then be used to identify sentences from additional documents for presenting to a user, for instance as suggestions when a user is creating an agreement document based on terms inputted by the user, as described above with regards to FIG. 5.

Additional Configuration Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like.

Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
    identifying a first set of agreement documents associated with a received set of clause terms;
    identifying a first set of text portions within the first set of agreement documents that include a threshold number of the received set of clause terms;
    identifying a second set of text portions within a second set of agreement documents associated with a subject using a machine learned language model;
    presenting each of a plurality of the second set of text portions within a corresponding portion of an interface;
    determining a measure of similarity between the first set of text portions and each of the text portions in the second set of text portions; and
    for each text portion in the second set of text portions,
        presenting the measure of similarity to a user within the corresponding interface portion;
        identifying the agreement document from which the text portion originates;
        determining characteristics of the agreement document from which the text portion originates; and
        in response to receiving a selection from a user, presenting the determined characteristics to the user.

2. The method of claim 1, wherein the subject is selected based on the received set of clause terms.

3. The method of claim 1, wherein the first set of agreement documents is associated with at least one of:
    a user;
    an entity associated with the user; and
    documents published in a public database.

4. The method of claim 1, wherein the first set of agreement documents comprises all documents from a document corpus associated with a threshold number of the received set of clause terms.

5. The method of claim 1, wherein the first set of agreement documents comprises a threshold number of documents.

6. The method of claim 1, comprising:
    generating a training language set based on the identified first set of text portions;
    training the machine learned language model using the training language set;
    updating the training language set by, in response to receiving a selection of a presented text portion from the second set of text portions, adding the selected text portion to the training language set and replacing the selected text portion presented within the corresponding interface portion with another text portion from the same agreement document of the second set of agreement documents; and
    retraining the machine learned language model using the updated training language set;
    wherein updating the training language set further comprises:
        in response to receiving a selection of a different agreement document of the second set of agreement documents, replacing the selected text portion presented within the corresponding interface portion with another text portion from the different agreement document.

7. The method of claim 1, comprising:
    generating a training language set based on the identified first set of text portions;
    training the machine learned language model using the training language set;
    updating the training language set by, in response to receiving a selection of a presented text portion from the second set of text portions, adding the selected text portion to the training language set and replacing the selected text portion presented within the corresponding interface portion with another text portion from the same agreement document of the second set of agreement documents; and retraining the machine learned language model using the updated training language set;

wherein updating the training language set further comprises:

in response to a threshold number of text portions being presented from the same agreement document, replacing the selected text portion presented within the corresponding interface portion with another text portion from a different agreement document of the second set of agreement documents.

8. The method of claim 1, wherein the characteristics of the agreement document comprise at least one of:

a context of the document;
an author of the document;
an entity associated with the document; and
an industry associated with the document.

9. A non-transitory computer-readable storage medium storing executable instructions that, when executed by a hardware processor, cause the hardware processor to:

identify a first set of agreement documents associated with a received set of clause terms;

identify a first set of text portions within the first set of agreement documents that include a threshold number of the received set of clause terms;

identify a second set of text portions within a second set of agreement documents associated with a subject using a machine learned language model;

present each of a plurality of the second set of text portions within a corresponding portion of an interface;

determine a measure of similarity between the first set of text portions and each of the text portions in the second set of text portions; and for each text portion in the second set of text portions,
present the measure of similarity to a user within the corresponding interface portion;
identify the agreement document from which the text portion originates;
determine characteristics of the agreement document from which the text portion originates; and
in response to receiving a selection from a user, present the determined characteristics to the user.

10. The non-transitory computer-readable storage medium of claim 9, wherein the subject is selected based on the received set of clause terms.

11. The non-transitory computer-readable storage medium of claim 9, wherein the first set of agreement documents is associated with at least one of:

a user;
an entity associated with the user; and
documents published in a public database.

12. The non-transitory computer-readable storage medium of claim 9, wherein the first set of agreement documents comprises all documents from a document corpus associated with a threshold number of the received set of clause terms.

13. The non-transitory computer-readable storage medium of claim 9, wherein the first set of agreement documents comprises a threshold number of documents.

14. The non-transitory computer-readable storage medium of claim 11, wherein the instructions that cause the hardware processor to perform operations further comprising:

generate a training language set based on the identified first set of text portions;

train the machine learned language model using the training language set;

update the training language set by, in response to receiving a selection of a presented text portion from the second set of text portions, adding the selected text portion to the training language set and replacing the selected text portion presented within the corresponding interface portion with another text portion from the same agreement document of the second set of agreement documents; and retrain the machine learned language model using the updated training language set;

wherein update the training language set further comprises:

in response to receiving a selection of a different agreement document of the second set of agreement documents, replace the selected text portion presented within the corresponding interface portion with another text portion from the different agreement document.

15. The non-transitory computer-readable storage medium of claim 9, wherein the instructions that cause the hardware processor to perform operations further comprising:

generate a training language set based on the identified first set of text portions;

train the machine learned language model using the training language set;

update the training language set by, in response to receiving a selection of a presented text portion from the second set of text portions, adding the selected text portion to the training language set and replacing the selected text portion presented within the corresponding interface portion with another text portion from the same agreement document of the second set of agreement documents; and retrain the machine learned language model using the updated training language set;

wherein update the training language set further comprises:

in response to a threshold number of text portions being presented from the same agreement document, replace the selected text portion presented within the corresponding interface portion with another text portion from a different agreement document of the second set of agreement documents.

16. A document management system, comprising:

a hardware processor; and
a non-transitory computer-readable storage medium storing executable instructions that, when executed, cause the hardware processor to:

identify a first set of agreement documents associated with a received set of clause terms;

identify a first set of text portions within the first set of agreement documents that include a threshold number of the received set of clause terms;

identify a second set of text portions within a second set of agreement documents associated with a subject using a machine learned language model;

present each of a plurality of the second set of text portions within a corresponding portion of an interface;

determine a measure of similarity between the first set of text portions and each of the text portions in the second set of text portions; and for each text portion in the second set of text portions, present the measure of similarity to a user within the corresponding interface portion;
identify the agreement document from which the text portion originates;
determine characteristics of the agreement document from which the text portion originates; and
in response to receiving a selection from a user, present the determined characteristics to the user.

\* \* \* \* \*